(12) United States Patent
Eckel et al.

(10) Patent No.: US 9,000,902 B2
(45) Date of Patent: Apr. 7, 2015

(54) DRIVER ASSISTANCE SYSTEM AND METHOD FOR OPERATING SAME

(75) Inventors: Matthias Eckel, Kallenberg (DE); Juergen Hoetzel, Florstadt (DE)

(73) Assignee: Robert Bosch GmbH, Stuttgart (DE)

( * ) Notice: Subject to any disclaimer, the term of this patent is extended or adjusted under 35 U.S.C. 154(b) by 827 days.

(21) Appl. No.: 12/676,464

(22) PCT Filed: Jul. 24, 2008

(86) PCT No.: PCT/EP2008/059686
§ 371 (c)(1),
(2), (4) Date: Jun. 30, 2010

(87) PCT Pub. No.: WO2009/040155
PCT Pub. Date: Apr. 2, 2009

(65) Prior Publication Data
US 2010/0277297 A1 Nov. 4, 2010

(30) Foreign Application Priority Data

Sep. 24, 2007 (DE) .......................... 10 2007 045 561

(51) Int. Cl.
*B60Q 1/00* (2006.01)
*G01S 13/93* (2006.01)
(Continued)

(52) U.S. Cl.
CPC ............... *G01S 13/931* (2013.01); *G01S 7/524* (2013.01); *G01S 7/526* (2013.01); *G01S 15/931* (2013.01); *G01S 13/878* (2013.01); *G01S 15/876* (2013.01); *G01S 2015/938* (2013.01); *G01S 2013/9314* (2013.01); *G01S 2013/9364* (2013.01); *G01S 2013/9375* (2013.01); *G01S 2013/9378* (2013.01); *G01S 2013/9385* (2013.01); *G01S 2013/9389* (2013.01)

(58) Field of Classification Search
USPC ........ 340/3.32, 435, 436, 438, 506, 507, 541, 340/901, 903, 942, 943, 286.05, 431, 463, 340/904, 932.2; 342/118, 70; 367/87, 99, 367/107, 907; 701/301; 180/169
See application file for complete search history.

(56) References Cited

U.S. PATENT DOCUMENTS 4,490,716 A * 12/1984 Tsuda et al. .................. 340/904
4,736,367 A 4/1988 Wroblewski
(Continued)

FOREIGN PATENT DOCUMENTS

DE 19744185 4/1999
DE 19963755 7/2001
(Continued)

OTHER PUBLICATIONS

International Search Report, PCT International Patent Application No. PCT/EP2008/059686, dated Dec. 23, 2008.

*Primary Examiner* — Brian Zimmerman
*Assistant Examiner* — An T Nguyen
(74) *Attorney, Agent, or Firm* — Kenyon & Kenyon LLP (57) ABSTRACT

A driver assistance system and method for operating a driver assistance system, the driver assistance system provides a plurality of distance sensors, in particular ultrasonic sensors, which are spatially distributed and communicate with each other with the aid of a data bus. The sensors have an identical design and may be initialized by themselves using a method without a control unit and may synchronize the distance detection among themselves. The overall result of a measurement of the sensors is supplied to an output unit and displayed to the driver.

15 Claims, 3 Drawing Sheets (51) Int. Cl.
  *G01S 7/524* (2006.01)
  *G01S 7/526* (2006.01)
  *G01S 15/93* (2006.01)
  *G01S 13/87* (2006.01)
  *G01S 15/87* (2006.01)

(56) References Cited

U.S. PATENT DOCUMENTS

| | | | |
|---|---|---|---|
| 5,229,975 A * | 7/1993 | Truesdell et al. | 367/107 |
| 5,272,476 A * | 12/1993 | McArthur et al. | 340/870.13 |
| 5,373,482 A * | 12/1994 | Gauthier | 367/99 |
| 5,588,123 A | 12/1996 | Loibl | |
| 5,864,304 A * | 1/1999 | Gerszberg et al. | 340/903 |
| 5,964,815 A * | 10/1999 | Wallace et al. | 701/45 |
| 6,088,810 A | 7/2000 | Ribes et al. | |
| 6,166,995 A | 12/2000 | Hoenes | |
| 6,307,811 B1 * | 10/2001 | Luber | 367/135 |
| 6,323,780 B1 * | 11/2001 | Morris | 340/692 |
| 6,326,886 B1 * | 12/2001 | Hoffsommer | 340/435 |
| 6,554,107 B2 * | 4/2003 | Yumura et al. | 187/247 |
| 6,784,808 B2 | 8/2004 | Hoetzel et al. | |
| 6,897,768 B2 * | 5/2005 | Sato et al. | 340/435 |
| 7,552,012 B2 * | 6/2009 | Lehner | 701/301 |
| 7,646,308 B2 * | 1/2010 | Paoletti et al. | 340/635 |
| 7,737,884 B2 * | 6/2010 | Haberland et al. | 342/173 |
| 7,839,270 B2 * | 11/2010 | Shimura | 340/431 |
| 8,144,197 B2 * | 3/2012 | Broad | 348/159 |
| 2004/0189452 A1 * | 9/2004 | Li | 340/435 |
| 2010/0277297 A1 * | 11/2010 | Eckel et al. | 340/435 |

FOREIGN PATENT DOCUMENTS

| | | |
|---|---|---|
| DE | 102006021378 | 12/2006 |
| DE | 102005033403 | 1/2007 |
| EP | 0613428 | 6/1995 |
| FR | 2874278 | 2/2006 |
| GB | 2352294 | 1/2001 |

* cited by examiner

DRIVER ASSISTANCE SYSTEM AND METHOD FOR OPERATING SAME

FIELD OF THE INVENTION

The present invention relates to the field of driver assistance systems for motor vehicles, more specifically to the field of systems for detecting surroundings of vehicles, which are used, for example, for distance warning, parking space detection, and parking assistance systems.

BACKGROUND INFORMATION

In detection systems of this type, ultrasound or microwave sensors are used, for example, for transmitting wireless signals and for detecting echo signals which are reflected by objects in the surroundings of the vehicle.

By ascertaining the propagation times of the signals and with the aid of different methods, a distance between the reflected objects and the sensors may be individually determined.

In many modern systems of the above-described type, a plurality of sensors is used for improving the detection range and the detection resolution with the objective of detecting the surroundings of the vehicle in all relevant directions.

German Patent Application No. DE 102005033403 A1 describes a conventional method for measuring distances, for example, using radar, lidar, or acoustic waves in which a signal propagation time is measured and analyzed. In order to accurately determine the propagation time, the reflected and detected signal is compared with a reference signal associated with the transmitted signal via correlation analysis, using a "matched filter."

German Patent Application No. DE 19744185 A1 describes an ultrasound distance measuring system for a motor vehicle, in which a plurality of ultrasonic transducers is used. The simultaneous transmission of ultrasound pulses is used by making use of the superimposition and addition of corresponding wave amplitudes in order to achieve a more powerful transmission and thus greater detection ranges.

Great Britain Patent No. GB 2352294 A describes an ultrasound distance measuring system for motor vehicles in which transducers are operated consecutively at different frequencies in order to correct interferences or cancellations which may accidentally occur at certain frequencies, by operating at other frequencies.

German Patent Application No. DE 19963755 A1 describes a device for distance measurement for a motor vehicle in which a Plurality of distance sensors are provided which may be operated in different operating modes to improve the quality of measurement.

European Patent No. EP 0613428 B1 describes a bus system, in particular in a motor vehicle, which has a bus connecting a plurality of control units and in which the data transmitted on the bus are analyzed in a central device. Messages are output at a low transmission repeat frequency and extracted from the individual control units as needed.

U.S. Pat. No. 6,088,810 A1 describes a device for synchronized data transmission between spatially offset measuring devices or sensors or between these and a data processing device. The device includes a serial bus over which the components of the device communicate in two different operating modes.

U.S. Pat. No. 4,736,367 A1 describes a device for controlling and monitoring a plurality of relay circuits which are connected to the device via a single-wire bus system.

German Patent Application No. DE 102006021378 A1 describes a reverse drive sensor for a motor vehicle in which the function of a control unit for a plurality of sensors is assumed by a master sensor, which has, like similar, associated slave sensors, a microprocessor, and a transducer for transmitting and receiving ultrasound signals. The master sensor controls the timing for operating the slave sensors and for detecting the results.

SUMMARY

According to example embodiments of the present invention, a driver assistance system is provided for detecting the surroundings of a motor vehicle, having at least two sensors for transmitting wireless signals and for detecting any reflected echo signals, at least one analyzer unit for determining a propagation time of a signal, and output unit for transmitting the result of the detection of the surroundings to the driver.

Example embodiments of the present invention configure a driver assistance system of the type mentioned at the outset to operate reliably and which are simplified in such a way that the manufacture and assembly of the system is as cost-effective and fail-safe as possible.

In accordance with the present invention, an identical configuration of all sensors reduces the production costs and, in particular, the complexity in assembling the system may be kept low. It is not necessary to make a distinction, during assembly, between the different sensors to which different installation locations in the vehicle are assigned. In addition, it is provided that the sensors adjust and compare their corresponding individual detection results and transmit the corresponding overall result to an output unit which is connected to the bus system and which is responsible only for the recognizability of the detection result to a driver. For this purpose, the output unit may contain a visual or acoustic or a combined visual/acoustic display, for example, in the form of a screen, one or more signal lights, or an acoustic signaling unit. A central control unit for combining the detection results of the individual sensors may be omitted according to the present invention.

The individual sensors may coordinate among themselves the sequence and time schedule in which they perform their measurements if necessary, i.e., transmit and coordinate appropriate signals or, if the signals do not interfere with each other, the sensors may also perform the measurements without mutual synchronization. As a result, each of the sensors keeps instantaneous detection results in readiness at certain points in time, these results being present in the form of propagation time information, of an object distance derived therefrom, or as information that no reflected signal has been detected.

For this purpose, after transmitting a signal, each sensor waits for results for a certain measuring period, the measuring period being adjusted to the distance to be monitored from the motor vehicle, i.e., from the particular sensor, to the sensor technology, and to the sensor measuring method. In the case of a detection range of five meters and when using ultrasound signals and a pulse echo measuring method, a measuring period of 30 milliseconds may be selected, for example. If no reflected signal arrives during this time period, the individual sensor concludes, in its analyzer unit, that no object is located in the space that it is monitoring.

The individually ascertained detection results of the sensors are transmitted by each sensor to at least one other sensor, for which an appropriate transmission protocol requiring the integration of the detection values it has ascertained into a data message may be used on the bus system, the previously transmitted detection results of other sensors also being repeated in the data message. In this way, the data message is enriched by an additional detection result after each repetition by another sensor, so that after a system cycle, which is a function of the number of sensors, the data message will contain all detection results of all sensors.

At this point in time, the output unit may display the detection results or parts thereof (e.g., the closest measured distance) to the driver.

A new detection period may then be started in the following system cycle.

An advantageous embodiment of the present invention provides that each analyzer unit has a conversion module for ascertaining an object distance from the signal propagation time.

The analyzer units may additionally also each have a comparator module for comparing the object distance ascertained in the particular sensor or the signal propagation time with the values ascertained by the other sensors.

Alternatively or additionally, each analyzer unit may have a limiting value comparator module for comparing the object distance ascertained in the particular sensor with a limiting value associated with the particular sensor.

A system according to the present invention allows each sensor to compare its detection result with the values of the other sensors when transmitting the detection values between the sensors and to decide how to evaluate the detection value delivered by it in relation to the other detection values.

For example, it may be provided that each sensor evaluates for itself whether the object distance ascertained by it is less than all the other object distances and, in this case, the particular sensor may identify its detection result accordingly in the data message on the bus system. Any subsequent sensor then compares its detection results either with all the previously ascertained results or only with the object distance identified as minimum and, if necessary, modifies the data message accordingly.

After all sensors have contributed and evaluated their detection results, a data message appears on the bus system, which contains all the relevant information about the object distances which have been ascertained by the individual sensors, as well as about the ascertained minimum object distance.

For this purpose, a limiting value may be assigned to each of the sensors, which identifies a critical object distance. If an object distance which is less than the limiting value is ascertained, the detection result is identified accordingly and the corresponding information is included in the data message. In this way, by repeating and completing the data message by all the sensors, an overall message is obtained, which also contains the information of which of the sensors have ascertained critical object distances.

As a result, a data message which may be supplied to an output unit without further evaluation of the detection results, is created without the intervention of a control unit, only by the cooperation of the sensors. The output unit may generate a display bar reflecting the corresponding object distances for each sensor individually and also identifying a distance below a critical object distance. Accordingly, as soon as the distance detected by at least one sensor is less than the critical distance, a warning signal in acoustic and/or visual form may be output.

Advantageously, each of the sensors has a microprocessor, a module for activating and reading a transducer, and a bus driver module.

These elements are used for ascertaining corresponding measuring results, as well as for pre-processing, for detecting the data message previously present on the bus system, and for transmitting to the bus system.

The module for activating and reading the transducer may be designed, for example, as an application-specific integrated circuit (ASIC); a microprocessor and, optionally, also a data memory in the form of an EPROM, may also be integrated into the ASIC. The bus driver module may be present separately as an integrated circuit; however, it may also be integrated into the ASIC.

It is also possible to integrate the above-mentioned elements, except the data memory unit, into each sensor, but to connect the sensors to a central data memory unit in the form of an EPROM over the bus system. The particular data memory unit, having a centralized or decentralized design, normally also contains software for operating the microprocessor and appropriate parameters; both the overall software and also the parameters for each sensor may be different. Here, the hardware architecture and the basic software for reloading other software of each sensor is identical.

The data memory unit may also be centrally integrated into a data processing system of the motor vehicle which performs functions other than that of the driver assistance system.

A plurality of data processing systems of this type are present in a vehicle, for example, in the engine controller, in the navigation device, or in other multimedia units of the vehicle such as a car radio or a sound control processor. Since all these units have data memories, a data memory unit of this type may be additionally used for the sensors of the driver assistance system.

In a driver assistance system according to the present invention, a plurality of sensors, in particular at least four or even at least ten sensors may be provided. The system is scalable in the sense that no design changes, need to be made in the individual sensors if they are used for a system having more or fewer sensors. The operating software is individually adaptable, so that a certain number of sensors present in the specific case may be operated. The output unit may also be adaptable to a certain number of sensors.

The present invention relates, in addition to a driver assistance system of the above-described type, to a method for operating a driver assistance system having at least two sensors for transmitting wireless signals and for detecting any reflected echo signals, all sensors having the same design and each sensor having a transducer and an analyzer unit for determining a propagation time of a signal, and the sensors being interconnected with the aid of a bus system, and the bus system being formed by a bus line in which the sensors are connected to each other in the form of a linear chain, and each of the sensors being able to open and close the bus line to the next downstream sensor with the aid of a switch, having the following steps:

initially all switches are open, each sensor checks whether it is connected to the bus line, if a sensor is connected to the bus line, it analyzes any signal transmitted on the bus line, which contains the numbers of the already logged-in sensors, the sensor logs in using the next higher log-in number, closes the bus line to the next downstream sensor, and the sensor transmits the number of logged-in sensors on the bus line.

At the start of the operation of the driver assistance system according to the present invention, each of the sensors is in the same initial state. The first sensor, which is directly connected to the bus line, receives the signal present on the bus line, which may be given, for example, by a fixed or variable voltage signal, in the simplest case by a voltage applied to the bus line. Since the switches of the individual sensors are open, the remaining sensors do not receive this signal.

The first sensor draws the conclusion therefrom that no signals of other sensors are being transmitted to it, that it is the first sensor to be initialized, and assigns itself the log-in number 1.

With the given physical system topology, its position on the vehicle is thus already established. After initialization, it closes the switch and thus establishes the connection to the next neighboring sensor, which thus registers a signal on the bus line. In addition, the first sensor transmits the information to the second sensor that the first sensor has already logged in. On the basis of the initialization program shared by all sensors, the second sensor draws the conclusion therefrom that it may only be the second sensor; it logs in as the second sensor, and turns on the switch which connects it to the next neighboring sensor, the potential third sensor. In this way, the initialization process progresses until all sensors have been initialized and logged in under their respective numbers. By this time, at the latest, information exists about the number of sensors and thus also about the configuration of the system. For example, the distribution of the sensors present in the motor vehicle may be inferred from their number. For example, it may be provided that in the event of a system configuration having eight sensors, four of them are provided on the front bumper starting with sensor #1 front left to sensor #4 front right and four of the sensors are provided on the rear bumper starting with sensor #5 rear right and ending with sensor #8 rear left.

In the case of a system having ten sensors, the software would recognize, for example, on the basis of the given settings (model of system topology for ten-sensor systems) that, in this case, four sensors are provided on the front bumper, #5 on the right-hand side of the vehicle, #6 through #9 on the rear bumper, and #10 on the left-hand side of the vehicle. This information is stored in the software shared by all sensors or in the centrally stored software which is accessible to all sensors. In addition to the individual sensor positions, individual limiting values for critical object distances may also be stored, so that after initialization, each sensor has access to the critical object distance assigned to it in the form of a limiting value.

As soon as the number of sensors has been established, it is also known, for the measuring operation, how many detection results must be collected in the data protocol for one run on the bus system until the next system cycle is started.

The present invention also relates to a method for operating a driver assistance system having at least two sensors for transmitting wireless signals and for detecting any reflected echo signals, all sensors having the same design and each sensor having a transducer and an analyzer unit for determining a propagation time of a signal, and the sensors being connected to each other and to an output unit with the aid of a bus system, each of the sensors performing a propagation time measurement, possibly ascertaining a propagation time and relaying the detection result to at least one other sensor, and each of the sensors analyzing any propagation time it has ascertained by comparing it to the propagation times communicated to it and also transmitting the analysis.

In an example method, one of the sensors, for example, #1 may start and transmit a signal, detect the reflection, and ascertain a propagation time and/or an object distance therefrom. This measured value or the information that no reflection has been detected may be integrated into the data message on the bus system and transmitted by the sensor.

Thereupon, the next sensor, for example, #2, may perform a similar measurement and additionally integrate its detection result into the data message.

In addition, the second sensor may analyze its detection results with respect to the results of the first sensor and may, for example, indicate if the object distance detected by it is less than the object distance detected by the first sensor.

This procedure is then repeated by the other sensors, so that at the end of the system cycle, in addition to the detected object distances and error displays, also the shortest object distance and the number of the sensors that have ascertained it, are available. These quantities may be transmitted without any further processing to the output unit or removed from the bus system and displayed visually and/or acoustically. The sensor having ascertained the shortest object distance may be specifically marked in a display of the output unit, for example, by a blinking and/or color-highlighted display.

The present invention also relates to a method for operating a driver assistance system having at least two sensors for transmitting wireless signals and for detecting any reflected echo signals, all sensors having the same design and each sensor having a transducer and an analyzer unit for determining a propagation time of a signal, and the sensors being connected to each other and to an output unit with the aid of a bus system, each of the sensors performing a propagation time measurement, possibly ascertaining a propagation time and comparing it to a limiting value assigned to it, the sensor analyzing the comparison and also transmitting the analysis to at least one other sensor, in particular together with the analyses of the other sensors, which have been transmitted to it.

Thus, each sensor individually performs a comparison with the limiting value assigned to it, which is given, for example, by a critical object distance. If an actual object distance which is less than the limiting value is ascertained by a sensor, the corresponding information is appended to the data message. In this way, at the end of the cycle, the output unit has a list of those sensors that have displayed values that are less than their individual limiting values. This information may be displayed without further pre-processing, so that the driver may be given an overview of which sensors have transmitted values that are critical for them.

Synchronization of the individual detection procedures may take place without a control unit in that, in a cycle, basically one of the sensors, for example, #1, starts and performs a measurement. Subsequently, the sensor may place the data message containing its detection results on the bus system, whereupon the next sensor of the sequence, for example, #2, performs its measurement synchronized with the placement of the data message on the bus, and so on until the end of the cycle. Since each sensor follows the placement of a data message on the bus, synchronization may take place with each placement. The initialization makes it known how many sensors are present in the system, so that after completing the data message, the output unit may access it and display the data, and the next detection cycle is started.

The sensors are basically initialized automatically at "power-up," i.e., without need for starting the procedure manually. The same is true for rebooting the system after a repair or after the replacement of a sensor.

BRIEF DESCRIPTION OF THE DRAWINGS

The present invention is illustrated in the figures and described below on the basis of an exemplary embodiment.

DETAILED DESCRIPTION OF EXAMPLE EMBODIMENTS

Figure 1:
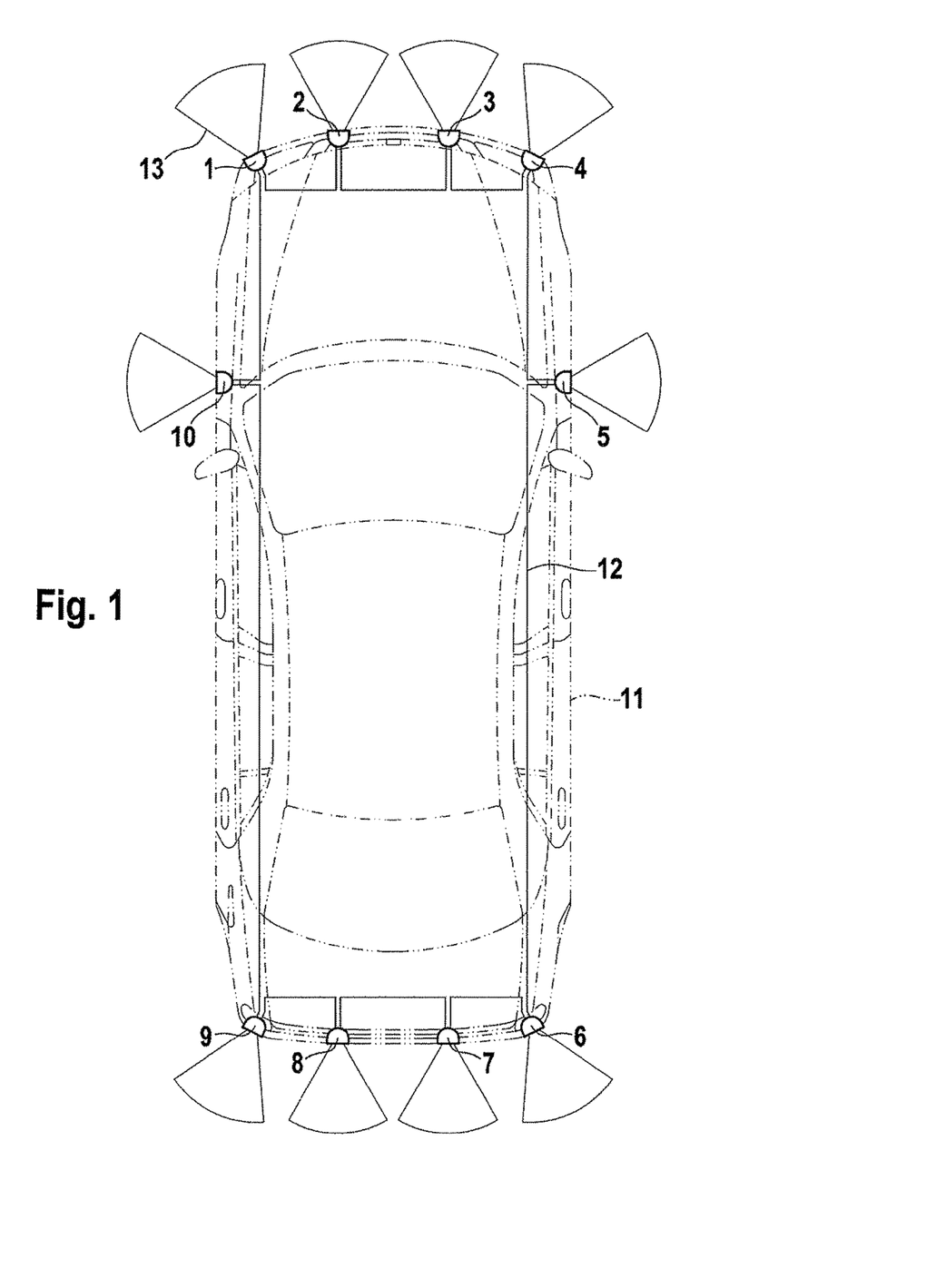
FIG. 1 shows a schematic top view of a vehicle having ten distributed sensors.

FIG. 1 shows, in top view, an outline of a vehicle 11 having sensors 1, 2, 3, 4, 5, 6, 7, 8, 9, 10 in the form of ultrasonic transducers. The first four sensors 1, 2, 3, 4 are distributed on the front end of the vehicle; sensor 5 is on the right-hand side, sensor 10 on the left-hand side of the vehicle, and sensors 6, 7, 8, 9 are on the rear end on the bumper of the vehicle.

Sensors 1 through 10 are connected with the aid of a bus line 12; the bus line passes through the sensors and may be interrupted within each sensor.

In the Figure, a transmission/detection cone 13, which represents the orientation of the particular sensor, is associated with each of sensors 1 through 10. The cones may intersect, but they may also be dimensioned so that the detection ranges of the sensors are disjoined.

Figure 2:
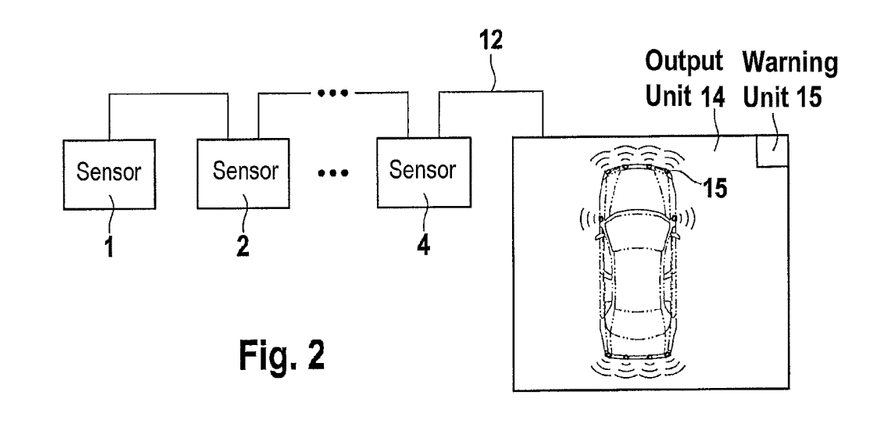
FIG. 2 shows the cooperation with the output unit.

In addition to a number of sensors 1, 2, 4 and bus line 12, FIG. 2 shows an output unit 14 connected thereto, which has a screen showing a vehicle in top view and the detection bars around it associated with the particular sensors. Using the detection bars which are tripartite in this example, it may be shown whether the space detected by the particular sensor is free of obstacles and if an obstacle has been detected, the illustration shows the distance of the obstacle from the particular sensor.

In addition, a visual warning display 15, which shows if a distance is less than the individual limiting value, is associated with each sensor.

Furthermore, the display unit is provided with an acoustic signaling unit 15, which may output a signal tone to the driver if the distance is less than the limiting range of one of the sensors.

Figure 3:
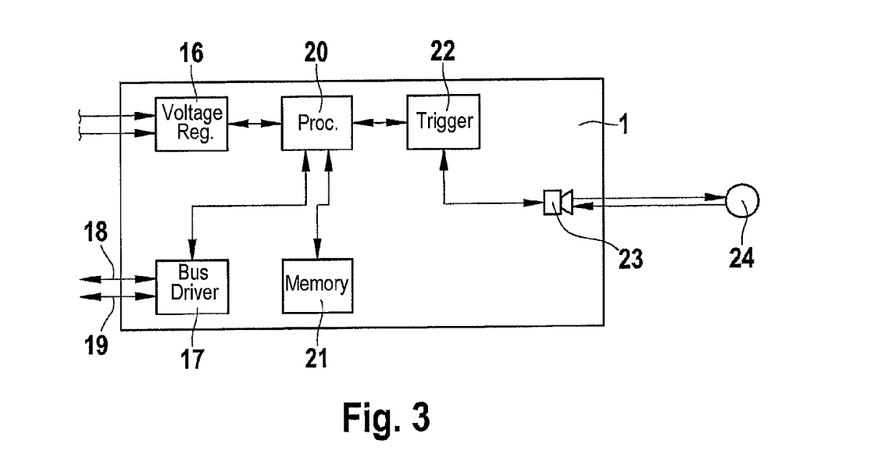
FIG. 3 shows the structure of a sensor.

FIG. 3 shows as an example the construction of an individual sensor 1, which may be encapsulated and located outside the motor vehicle, protected against harmful environmental conditions, and which may contain, for example, a printed circuit board having different electronic components in the form of integrated circuits or also only a single integrated circuit.

In the depicted example, a voltage regulator 16 is provided in the sensor, which is connected, on the one hand, to the battery of the vehicle or another voltage supply and, on the other hand, to ground potential, and which is responsible for a constant voltage supply to the circuits. In addition, a bus driver module 17 is provided, whose first terminal 18 and second terminal 19 are connected to the bus, and within which a switch is provided for interrupting the bus line.

The bus driver module is connected to a microprocessor 20, which is programmable and is in turn connected to a data memory unit 21, for example, in the form of a PROM/EPROM.

The data memory unit may also be situated outside the sensor, centrally accessible to all sensors, and connected to the bus line, for example.

Microprocessor 20 is connected to a trigger module 22, which drives an ultrasonic transducer 23, and also analyzes and registers the reflection signals received by ultrasonic transducer 23.

In the figure, reference numeral 24 schematically identifies an object to be potentially detected.

The individual components of the sensor such as module 22 and the microprocessor, as well as optionally the bus driver module, may be combined in a single integrated circuit, which may optionally also contain the voltage transformer in integrated form.

Figure 4:
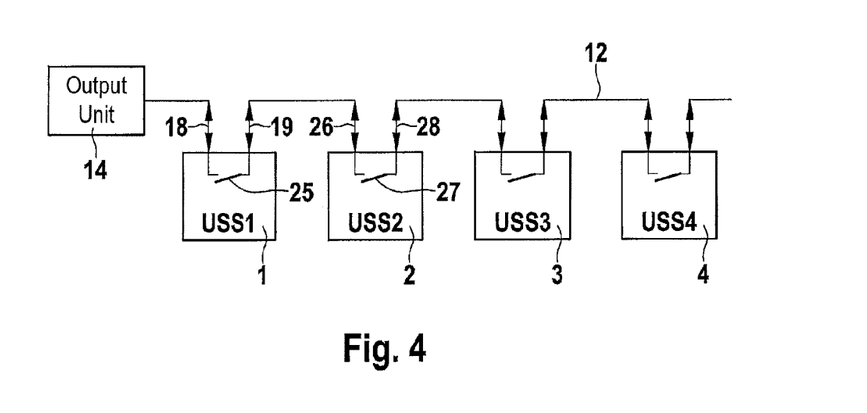
FIG. 4 shows a detailed representation of the bus line.

Data memory unit 21 may also be integrated into this module. FIG. 4 schematically shows the interconnection of bus line 12 with four sensors 1, 2, 3, 4 and an output unit 14. It shows that first sensor 1 is connected, with its first terminal 18, to the bus line and display/output unit 14, and has a switch 25 for interrupting the bus line within it. Because display unit 14 is directly connected to sensor 1, the system may be expanded without modifying the previous topology.

Second terminal 19 of sensor 1 is connected to second sensor 2, specifically to its first terminal 26, via an extension of bus line 12. The second sensor, like all other sensors, also has a switch 27, which may be opened and closed and connects first terminal 26 to second terminal 28 of second sensor 2. In this way, the sensors present are connected to each other and also to output unit 14.

Figure 5:
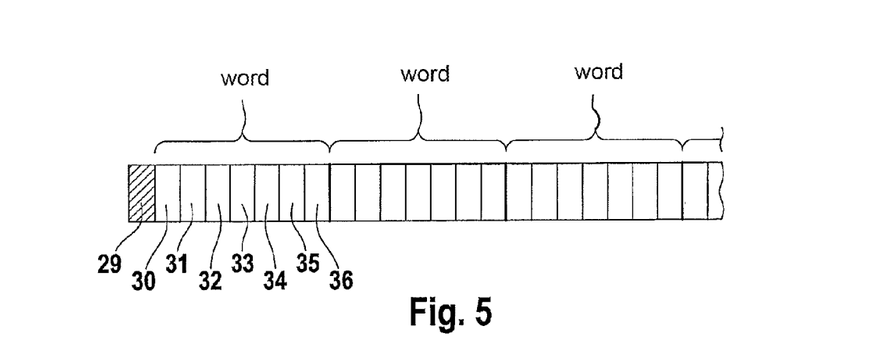
FIG. 5 shows an exemplary representation of a data message.

FIG. 5 shows, as an example, a data message on the basis of an 8-bit word, such as may be used for communication among the sensors. For better resolution of the object distance, the word length may also be greater than 8 bits. As viewed in the figure, the data message is transmitted from left to right with progressing time, starting with a start bit 29. Seven bits follow, which are associated with the first sensor, the first sensor bit 30 showing whether the corresponding sensor has already enriched the data message with its detection quantities. Second sensor bit 31 shows whether the individual limiting value of the corresponding sensor was undershot. Third sensor bit 32 shows whether, up to the time of composition of the data message, the corresponding sensor has ascertained an extreme value among the sensors in detecting the object distance, and the remaining four sensor bits 33, 34, 35, 36 are used for encoding the actually detected object distance of the corresponding sensor.

The data message is completed by the first sensor up to the eighth bit, including the start bit, and relayed to the second sensor, which completes the data protocol again after having performed its measurement and reproduces the data of the first sensor, so that, when relayed to the third sensor, the data message already has fifteen bits completed. The method proceeds in this way for the other sensors, so that when the data protocol is completed, full information is available about the detected measured values and may be relayed to output unit 14, which may display the corresponding data without further data processing and thus provide the driver with an overview of the objects possibly located in the detection range around his vehicle.

What is claimed is:

1. A driver assistance system for detecting surroundings of a motor vehicle, comprising:
   at least two sensors to transmit wireless signals and to detect any reflected echo signals, the sensors having an identical design, each of the sensors having an analyzer unit to ascertain a signal propagation time, and a comparator module for comparing the ascertained signal propagation time with that ascertained by at least one preceding sensor in a bus system wherein the sensors are connected to each other via the bus system;
   an output/display unit to transmit a result of the detection of the surroundings to a driver, the sensors being connected to the output/display unit via the bus system;
   wherein each of the analyzer units has a conversion module to ascertain an object distance from the signal propagation time;

wherein each sensor evaluates the object distance and each sensor identifies its detection result in a data message via the bus system such that the data message includes all detection results of all the sensors, and each subsequent sensor compares by the comparator module its own detection result with one of: (i) all the detection results of all the sensors; or (ii) only with an identified minimum object distance ascertained from the conversion module; and wherein the data message is modified when the detection result is less than the other detection results or the minimum object distance.

2. The driver assistance system as recited in claim 1, wherein each of the analyzer units has a comparator module to compare an object distance ascertained in the corresponding sensor.

3. The driver assistance system as recited in claim 1, wherein each of the analyzer units has a comparator module to compare the signal propagation time with a value, ascertained by other sensors.

4. The driver assistance system as recited in claim 1, wherein each of the analyzer units has a limiting value comparator module to compare an object distance ascertained in the corresponding sensor with a limiting value associated with the corresponding sensor.

5. The driver assistance system as recited in claim 1, wherein each of the sensors has a microprocessor, a module to activate and read a transducer, and a bus driver module.

6. The driver assistance system as recited in claim 5, wherein each of the sensors has a data memory unit.

7. The driver assistance system as recited in claim 5, wherein the sensors are each connected to a central data memory unit.

8. The driver assistance system as recited in claim 7, wherein the central data memory unit is integrated into a data processing system of the motor vehicle, which performs functions other than that of the driver assistance system.

9. The driver assistance system as recited in claim 1, wherein the sensors have ultrasonic transducers.

10. The driver assistance system as recited in claim 1, wherein at least two sensors are provided.

11. The driver assistance system as recited in claim 10, wherein at least ten sensors are provided.

12. A method for operating a driver assistance system having at least two sensors for transmitting wireless signals and for detecting any reflected echo signals, all sensors having a same design and each sensor having a transducer and an analyzer unit for determining a propagation time of a signal, and the sensors being connected to each other and to an output unit with the aid of a bus system, the method comprising:
performing, by each of the sensors, a propagation time measurement;
determining, by each of the sensors, a propagation time;
relaying, by each of the sensors, a detection result to at least one other sensor;
comparing, at each of the sensors, the detection result of the respective sensor to the detection result relayed from at least one preceding sensor in the bus system;
selecting one of the compared detected results based on the comparing; and
transmitting a result of the selection to a next sensor in the bus system;
wherein each of the analyzer units has a conversion module to ascertain an object distance from the signal propagation time;
wherein each sensor evaluates the object distance and each sensor identifies its detection result in a data message via the bus system such that the data message includes all detection results of all the sensors, and each subsequent sensor compares by the comparator module its own detection result with one of: (i) all the detection results of all the sensors; or (ii) only with an identified minimum object distance ascertained from the conversion module; and
wherein the data message is modified when the detection result is less than the other detection results or the minimum object distance.

13. A method for operating a driver assistance system having at least two sensors for transmitting wireless signals and for detecting any reflected echo signals, all sensors having a same design and each sensor having a transducer and an analyzer unit for determining a propagation time of a signal, and the sensors being connected to each other and to an output unit with the aid of a bus system, the method comprising:
performing, by each of the sensors, a propagation time measurement;
ascertaining, by each of the sensors, a propagation time;
comparing, at each of the sensors, the ascertained propagation time with that ascertained by at least one preceding sensor in a bus system;
determining from the comparing a limiting value associated with the compared propagation times; and
transmitting the result of the determining, together with at least one ascertained propagation time, to at least one other sensor in the bus system;
wherein each of the analyzer units has a conversion module to ascertain an object distance from the signal propagation time;
wherein each sensor evaluates the object distance and each sensor identifies its detection result in a data message via the bus system such that the data message includes all detection results of all the sensors, and each subsequent sensor compares by the comparator module its own detection result with one of: (i) all the detection results of all the sensors; or (ii) only with an identified minimum object distance ascertained from the conversion module; and
wherein the data message is modified when the detection result is less than the other detection results or the minimum object distance.

14. The driver assistance system as recited in claim 1, wherein each of the sensors further includes a transducer module for:
reading a minimum object distance from a data message transmitted over the bus system from a preceding sensor to a current sensor in the bus system, the data message containing the minimum object distance as calculated by at least one preceding sensor in the bus system;
transmitting an updated minimum object distance as part of the data message to a next sensor in the bus system when an object distance ascertained by the current sensor is less than the read minimum object distance; and
otherwise transmitting the read minimum object distance to the next sensor in the bus system as part of the data message.

15. The driver assistance system as recited in claim 1, wherein each of the sensors further includes a transducer module for:
reading a minimum signal propagation time from a data message transmitted over the bus system from a preceding sensor to a current sensor in the bus system, the data message containing the minimum signal propagation time as determined by a plurality of preceding sensors in the bus system;
transmitting an updated minimum signal propagation time as part of the data message to a next sensor in the bus system when the signal propagation time ascertained by the current sensor is less than the read minimum signal propagation time; and otherwise transmitting the read minimum signal propagation time to the next sensor in the bus system as part of the data message.

\* \* \* \* \*